United States Patent [19]

Birger

[11] Patent Number: 4,999,800

[45] Date of Patent: Mar. 12, 1991

[54] FLOATING POINT ADDER WITH PRE-SHIFTER

[75] Inventor: Ari Birger, Haifa, Israel

[73] Assignee: Motorola, Inc., Schaumburg, Ill.

[21] Appl. No.: 434,208

[22] Filed: Nov. 13, 1989

[51] Int. Cl.⁵ .............................................. G06F 7/38
[52] U.S. Cl. ................. 364/748; 364/715.08
[58] Field of Search ................ 364/748, 745, 715.08

[56] References Cited

U.S. PATENT DOCUMENTS 4,807,172  2/1989  Nukiyama ................ 364/715.08

OTHER PUBLICATIONS

Earle et al., "*Exponent Differences and Preshifter*", IBM Tech. Disclosure Bulletin, vol. 9, No. 7, Dec. 1966, pp. 848–849.

Primary Examiner—Dale M. Shaw
Assistant Examiner—Tan V. Mai
Attorney, Agent, or Firm—Robert L. King

[57] ABSTRACT

The exponent computation part of a floating point adder and subtracter operates at high-speed. Prior to subtracting or adding of the mantissas, it is necessary to perform a computation on the exponents. The invention provides an exponent comparator and a pre-shifter responsive thereto for shifting the mantissa of at least one of the operands by at least one bit dependent on the comparison of at least the least significant bits of the exponents of the operands. The shift operation is carried out prior to the comparison of the most significant bits of the exponents of the operands. Once the most significant bits have been compared, the direction of final shifting can be determined and a further shift operation can be carried out, shifting either the unshifted or the pre-shifted mantissa by bit positions spaced in multiples of at least two.

5 Claims, 2 Drawing Sheets

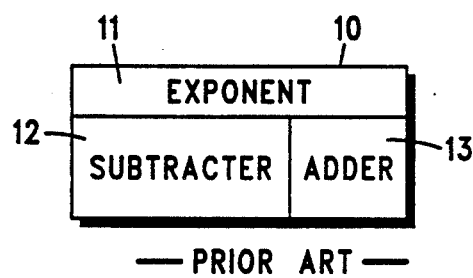
FIG. 1 —PRIOR ART—
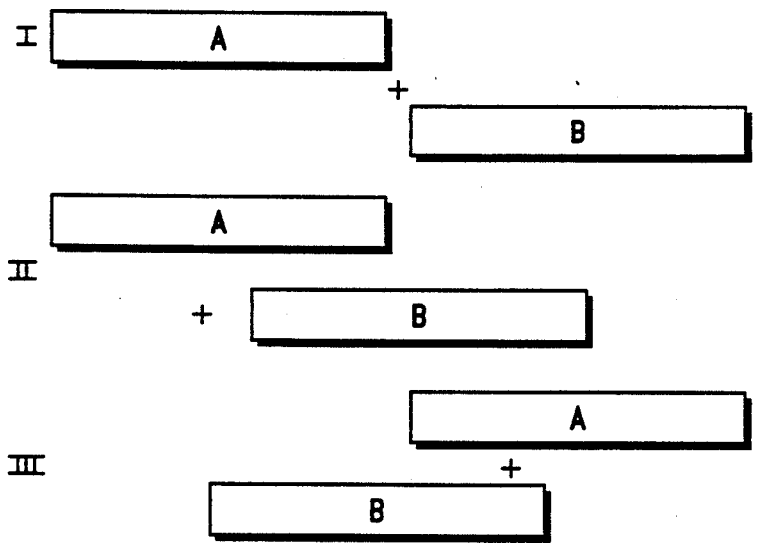
FIG. 2 —PRIOR ART—
FIG. 4
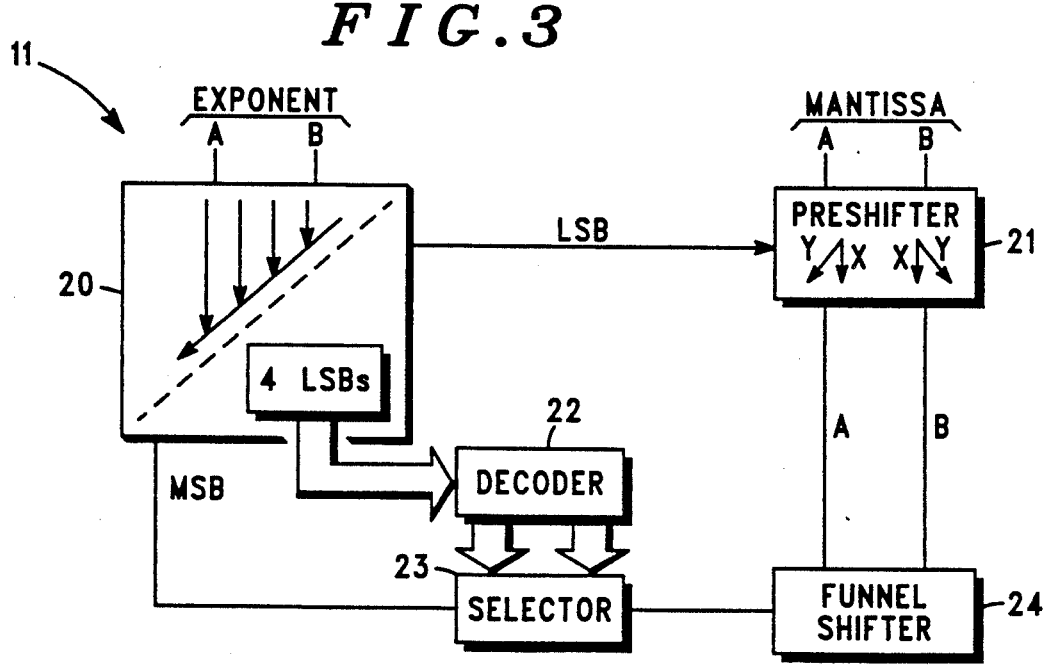
FIG. 3

FLOATING POINT ADDER WITH PRE-SHIFTER

BACKGROUND OF THE INVENTION

This invention relates to arithmetic circuits, and more particularly, to a floating point adder and subtracter.

SUMMARY OF THE PRIOR ART

A prior art floating point adder 10 is shown in FIG. 1, comprising an exponent computation part 11, a subtracter part 12 and an adder part 13. Prior to subtracting or adding in the parts 12 and 13, it is necessary to perform a computation on the exponent in part 11. Once this computation has been carried out, the numbers on which computation is to be carried in parts 12 and 13 can be shifted relative to one another, so that they have the same exponent. This invention relates to the exponent computation part 11.

Referring to FIG. 2, two floating point numbers A and B are represented which are to be added or subtracted. The left hand end of each number represents the most significant bit, and the right hand end represents the least significant bit. In scenario I, number A is very much greater than number B and there are no common bits which have the same order of magnitude. This is represented in the figure in that the two numbers do not overlap. In this situation addition or subtraction of the numbers is trivial, because the results, when represented in the same total number of bits as one of the operands will be identical to A unless there is a carry from number B. This case will be considered as trivial, because it requires no further computation.

In scenario II, number B has a smaller exponent than number A, but there is overlap, so that the higher bits of number B will have to be added (or subtracted) to number A. To do this, the mantissa of number B is shifted to the right while at the same time its exponent is increased by one for each shift position, until the exponents of the two numbers are equal. When the exponents are equal, the mantissas can be added or subtracted. Similarly, in scenario III, the mantissa of number A must be shifted to the right and its exponent increased to match that of number B. It is always the mantissa of the number having the lower exponent that is shifted. The shifting operation is carried out in exponent computation part 11 of the floating point adder 10.

It is known to compare the exponents of the two operands and, on the basis of this comparison shift one or other mantissa in a funnel shifter. The shifting is done in multiples of two, to minimize the amount of hardware required in the funnel shifter. For a 32-bit word, a 17-way multiplexer is required in the funnel shifter. In addition to the shifting by multiples of two, an additional shift of one position is carried out if necessary.

A disadvantage of the prior method of shifting described is that the exponent comparison must be carried out to the full before the shifting can be done.

SUMMARY OF THE INVENTION

It is an object of the present invention to reduce the time required to shift the mantissa of one operand relative to another operand in preparation for a floating point addition or subtraction.

According to the present invention, there is provided a floating point computation device for performing computation on two operands comprising:
an exponent comparator;
a pre-shift responsive thereto for shifting the mantissa of at least one of the two operands by at least one bit dependent on the comparison of at least the least significant bits (LSBs) of the exponents prior to the comparison of the most significant bits (MSBs) of the exponents.

The invention exploits the observation that if the LSBs of the exponents are equal then the number of position shifts (if any) of the mantissas will be even. In performing the comparison of the exponents, the least significant bits can be derived early on in the comparison (the more significant bits follow later), so that a pre-shift of one bit can be made even before it is known which of the exponents is greater. Once it has been determined which of the exponents is greater, the major part of the shifting can be carried out in multiples of two bits (i.e by 2, 4, 6 etc. bit positions).

BRIEF DESCRIPTION OF THE DRAWINGS

FIG. 1 shows a known floating point adder;

FIG. 2 shows three cases associated with two operands for adding (or subtracting) in a known floating point adder;

FIG. 3 shows the present invention for use in the exponent computation part 11 of the adder of FIG. 1;

FIG. 4 is a table showing the result of the computation carried out in the exponent computation part shown in FIG. 3.

DETAILED DESCRIPTION OF THE DRAWINGS

Figure 5:
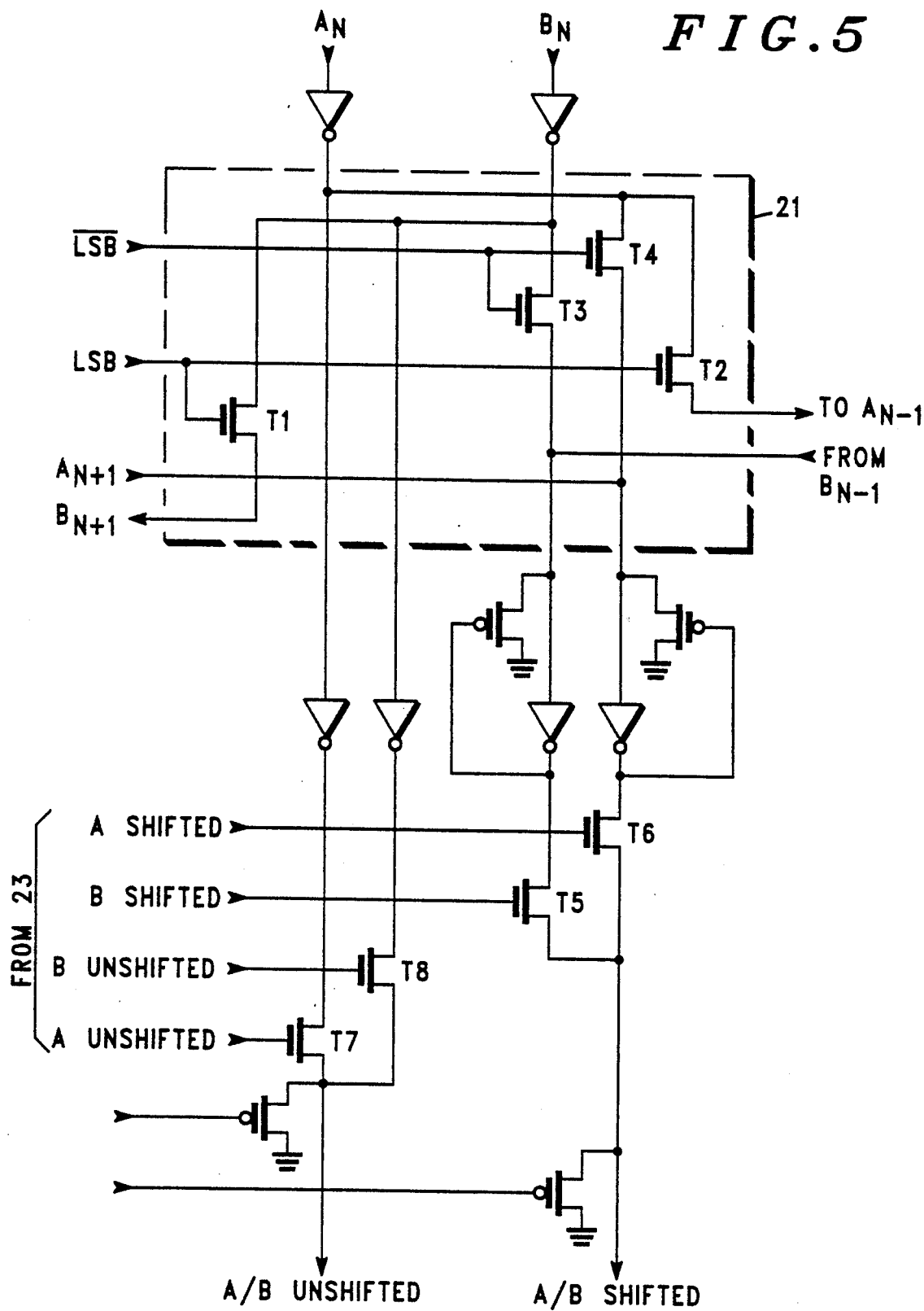
FIG. 5 shows the pre-shifter of FIG. 3.

Referring to FIG. 3, there is shown an exponent computation part 11 of the adder 10 comprising an exponent comparator 20, a pre-shifter 21, a decoder 22, a selector 23 and a funnel shifter 24.

The operation of the apparatus is as follows. The exponents and the mantissas of the floating point operands A and B are fed into the comparator 20 and the pre-shifter 21 respectively. The comparator 20 subtracts one exponent from the other, for example it computes (B−A). In performing this computation, the LSB can be derived early on. This LSB is passed to the pre-shifter 21. The details of the pre-shifter will be described in detail below, its general operation is as follows. If the LSB from the comparator 20 is 0, there is no need for any one-bit (odd) pre-shift and the pre-shifter 21 does not shift the mantissas, but provides, in accordance with arrows X, the inputs straight through to its outputs. On the other hand, if the LSB is one, the pre-shifter shifts mantissa A to the left and mantissa B to the right, one bit each, in accordance with arrows Y. The outputs of the pre-shifter 21 are made available to the funnel shifter 24. Before the funnel shifter 24 operates, the comparator 20 provides the four (out of five) least significant bits of its computation (i.e. all but the MSB) to a decoder 22. This decoder 22 calculates, in accordance with the table of FIG. 4, (B−A) and the two's complement thereof (i.e. A−B). Incidently, from this table it can be noted that the least significant bit of both of these computations is the same. It is that bit that is passed to pre-shifter 21. The decoder 22 makes the results of both of these computations available to selector 23. In this manner, both results are ready for use as soon as the MSB is derived from comparator 20. This MSB indicates whether A is greater than B or vice versa and accordingly whether the difference (B−A) or (A−B) should be selected from decoder 22. The output of selector 23 determines whether it is mantissa A or mantissa B that is to be shifted to the right. Its is always the mantissa which has the lower exponent that is shifted. The selector 23 determines which of the mantissas from pre-shifter 21 is to be shifter. The funnel shifter 24 shifts the mantissa in multiples of two positions in one operation. The non-shifted mantissa is passed directly from the input of the exponent computation part 11 to the subtracter 12 and/or adder 13 of FIG. 1.

Referring to FIG. 5, this figure in fact shows A being selectively shifted to the right and B being selectively shifted to the left. Contrary to FIG. 3, however, this is of no consequence, the principal being clear from the figures. When the signal on the LSB line is high, transistors T1 and T2 conduct while transistors T3 and T4 are non-conductive, so that $B_N$ is shifted to the left and $A_N$ is shifted to the right. In these circumstances, the signal from $B_{N-1}$ enters the circuit shown from the right and is available at transistors T5 and T6. Similarly, the un-shifted signals $A_N$ and $B_N$ are available at transistors T7 and T8. The four base inputs to transistors T5–T8 are controlled by selector circuitry 23. If the MSB of exponent comparator 20 determines that the exponent of B is greater than the exponent of A (i.e. A must be shifted further) then transistor T6 conducts while transistor T5 is non-conductive, so that A is output at the A/B shift output. At the same time, transistor T8 conducts and T7 is non-conductive, so that B appears unshifted on the A/B unshifted output. The former output passes to the funnel shifter 24 and the latter output passes directly to the subtracter 12 and/or adder 13.

If no pre-shift is to be made in the pre-shift 21, transistors T1 and T2 are non-conductive and transistors T3 and T4 conduct. The decision as to which of A or B is to be passed to the funnel shifter 24 is taken as before.

It will, of course, be understood that the above description has been given by way of example only, and that modifications of detail can be made within the scope of the invention.

I claim:

1. A floating point computation device for performing computations on two operands each having an exponent and a mantissa, comprising:
    an exponent comparator for comparing the exponents of the two operands to provide an output having a least significant bit and a most significant bit:
    a pre-shifter for receiving the mantissa of each of the two operands and being coupled to the exponent comparator for receiving a least significant bit resulting from the comparing of the exponents, the pre-shifter shifting one of the mantissas a predetermined number of bit positions in response to the least significant bit having a predetermined logic value and otherwise not shifting either input operand, the pre-shifter providing the mantissa of the two operands in either shifted or non-shifted form:
    a decoder coupled to the exponent comparator for receiving a predetermined number of least significant bits of the output of the exponent comparator, said decoder providing both a difference of the exponents of the two input operands and a two's complement of the difference:
    a selector circuit coupled to both the exponent comparator and the decoder for selecting and outputting one of the difference of the exponents or the two's complement thereof as an output signal in response to the most significant bit resulting from the comparing of the exponents: and
    a shifter circuit coupled to the pre-shifter for receiving the mantissa of the two input operands in either shifted or non-shifted form, and shifting at least one of the two mantissas by a predetermined number of bits position in response to the output signal of the selector circuit.

2. A computation device according to claim 1 wherein the predetermined number of bit positions which the shifter circuit shifts at least one of the two mantissas is a multiple of two.

3. In a data processor having a floating point adder, a method of computation of two floating point operands, each having an exponent and a mantissa, comprising the steps of:
    coupling the exponents of said operands to a comparator and comparing the exponents of the two input operands to provide output compare bits;
    pre-shifting with a first shifting circuit at least one mantissa a predetermined odd number of bit positions in response to a least significant bit of the output compare bits having a predetermined logic value and otherwise not shifting either mantissa of the floating point operands:
    decoding a predetermined number of the output compare bits by providing both a difference of the exponents of the two input operands and a two's complement of the difference:
    selecting one of either the difference of the exponents or the two's complement thereof to provide as a control signal in response to a most significant bit resulting from the comparing of the exponents: and
    further shifting with a second shifting circuit at least one of the two mantissas by a number of bit positions which is a multiple of two in response to the control signal.

4. In a floating point adder of a data processor for adding and subtracting floating point operands, a circuit for performing computations on two input operands each having an exponent and a mantissa, comprising:
    an exponent comparator for receiving the exponent of each of the two input operands and comparing the exponents of the two input operands to provide output compare bits;
    first shifting means for receiving the mantissa of each of the two input operands and being coupled to the exponent comparator for receiving a least significant bit resulting from the comparing of the exponents, said first shifting means selectively shifting at least one mantissa a predetermined odd number of bit positions in response to the least significant bit having a predetermined logic value and otherwise not shifting either input operand;
    a decoder having an input coupled to a predetermined number of the output compare bits provided by the exponent comparator, said decoder providing both a difference of the exponents of the two input operands and a two's complement of the difference;
    a selector circuit coupled to both the exponent comparator and the decoder for selecting and outputting one of the difference of the exponents or the two's complement thereof as an output signal in response to a most significant bit resulting from the comparing of the exponents; and
    second shifting means coupled to the first shifting means for receiving the mantissa of the two operands in either shifted or non-shifted form, and shifting at least one of the two mantissas by a number of bit positions which is a multiple of two in response to the output signal of the selector circuit.

5. The circuit of claim 9 wherein the first shifting means shifts each mantissa of the two input operands by one bit position.

* * * * *